United States Patent [19]
Horinka et al.

[11] Patent Number: 5,447,751
[45] Date of Patent: Sep. 5, 1995

[54] WRINKLE FINISH POWDER COATING

[75] Inventors: Paul R. Horinka, Reading; E. Susanne Deibert, Kenhorst; Diane K. Pennington, Reading; Gerald T. Werner, Jr., Birdboro, all of Pa.

[73] Assignee: Morton International, Inc., Chicago, Ill.

[21] Appl. No.: 207,772

[22] Filed: Mar. 8, 1994

[51] Int. Cl.⁶ .............................................. B05D 5/02
[52] U.S. Cl. .................................. 427/257; 428/152; 524/425; 525/353; 525/406; 525/428
[58] Field of Search ...................... 427/257; 428/152; 523/500; 524/428; 525/353, 406, 428

[56] References Cited

U.S. PATENT DOCUMENTS

| | | | |
|---|---|---|---|
| 3,954,898 | 5/1976 | Hirota et al. | 260/837 R |
| 4,094,721 | 6/1978 | Sturm et al. | 156/309 |
| 4,202,926 | 5/1980 | Dowbenko | 428/413 |
| 4,271,277 | 6/1981 | Golownia | 525/351 |
| 4,301,103 | 11/1981 | Uphoff | 428/170 |
| 4,341,819 | 7/1982 | Schreffler et al. | 427/195 |
| 4,556,693 | 12/1985 | Corcoran et al. | 525/162 |
| 4,599,401 | 7/1986 | Koleske | 528/408 |
| 4,751,112 | 6/1988 | Smith, Jr. et al. | 427/388.3 |
| 5,115,025 | 5/1992 | Koleske et al. | 525/162 |
| 5,115,083 | 5/1992 | Piedrahita et al. | 528/230 |
| 5,124,405 | 6/1992 | Erickson | 525/92 |
| 5,256,713 | 10/1993 | Jacobs, III et al. | 524/99 |

FOREIGN PATENT DOCUMENTS 195660  9/1986  European Pat. Off. .
5271577 10/1993  Japan .

OTHER PUBLICATIONS

CA Selects: Costings, Inks, & Related Products. Issue 22, 1993, p. 7 119: 182962w.
Research Disclosure: Jul. 1993 No. 351 457–459.
Modern Paint and Coatings, Oct. 1980, pp. 88–92 (Formulation Techniques Using Triflic Acid Salts).
Journal of Paint Technology, vol. 44, No. 565, Feb. 1972 (Powder Coating: Why—How—When).

*Primary Examiner*—Tae H. Yoon
*Attorney, Agent, or Firm*—Robert M. Didrick; Gerald K. White

[57] ABSTRACT

The use of cyclamic acid as a catalyst for the curing of hydroxyl-functional resins having a functionality greater than 2 provides a wrinkle finish. The hydroxy-function may be present in polyesters, epoxies, and acrylate or methacrylate resins, among others. The polyester resins which are able to provide such a finish have a hot plate melt flow of from about 20 mm to about 150 mm.

6 Claims, No Drawings

WRINKLE FINISH POWDER COATING

TECHNICAL FIELD

This invention relates to coatings applied by fusion coating processes and more particularly to coating powders that yield wrinkle finishes upon curing. It relates still more particularly to such powders made from thermosettable hydroxy-functional resins.

BACKGROUND OF THE INVENTION

The coating compositions of this invention are dry, free flowing powders that may be used in fusion coating processes. "Fusion coating processes" are herein defined as those coating processes in which a coating powder is distributed over a substrate and heat, supplied from the substrate or an external source, fuses the powder into a continuous film. Examples of fusion coating processes include fluidized bed, electrostatic spraying, hot flocking, and cloud chambers. When the coating powder is based upon heat curing resins, as is the case of the hydroxy-functional resins of this invention, sufficient heat in excess of that required to fuse the powder must be available to cure the coating and fully develop its physical and chemical properties.

Wrinkle finishes are desired in many applications and are commonly applied to office equipment such as typewriters, staplers, dictating equipment, file cabinets, tool boxes, and the like. In addition to being aesthetically pleasing, these finishes have certain utilitarian functions: they hide surface defects of a substrate even when applied in thin films and, having a low gloss, they do not show scratches. Wrinkle finishes, as contemplated for the purposes of this invention, are reticulated, i.e., made up of a pattern of raised veins across the surface and are exemplified by interconnected star-burst patterns, mosaics, and by patterns similar to that of an alligator hide.

Wrinkle finish coatings conventionally are applied from solvent-based paints, usually using two coats, to establish a compound system in which the surface sets up first. When the rest of the coating cures, the resulting shrinkages deform the previously set surface and cause a fine wrinkle pattern to develop on the surface of the coating.

Epoxy resin-based powder coatings having wrinkle finishes are taught in U. S. Pat. No. 4,341,819. The wrinkle pattern is achieved by means of a special curing agent, methylene disalicylic acid, acting upon the epoxy groups of the resin. Because of the rather poor weatherability of epoxy resin coatings, these wrinkle-finish coatings are used almost exclusively on surfaces protected from the weather and are very popular for interior uses. Golownia teaches in U.S. Pat. No. 4,271,277 that catalysis of the curing of a hydroxyl polyester-based powder coating by an amine salt of p-toluene sulfonic acid causes a severe wrinkle in the surface of the cured coat whereas the wrinkle is avoided by the use of an amine salt of cyclohexyl sulfamic acid when the same curing agent, tetra (methoxymethyl) glycoluril, is used. What is needed is a predictable method for forming weatherable wrinkle finish coatings of all colors.

SUMMARY OF THE INVENTION

Accordingly, it is the object of this invention to provide a coating powder which will yield a coating having a low gloss and a randomly developed wrinkle pattern on its surface.

It is another object of this invention to provide a colored coating powder adapted to give a reproducible wrinkle finish.

It is another object of this invention to provide a method for generating a wrinkle finish on a powder coating made from a hydroxy-functional resin.

It is yet another object of this invention to provide a weatherable wrinkle finish on an article having a powder coating based on a hydroxy-functional resin.

These and other objects of this invention are achieved by applying a powder coating comprising a hydroxyl-functional resin having a functionality greater than 2, an aminoplast resin as a curing agent, and cyclamic acid as a catalyst to the surface of the substrate and curing the powder. In a preferred embodiment of the invention, calcium carbonate or another inorganic basic compound is present as a moderator of the curing reaction. The method of this invention is particularly suitable in the formation of wrinkle finishes on the surface of colored powder coatings.

DETAILED DESCRIPTION OF THE INVENTION

The wrinkle finish powder coatings are derived from hydroxy-functional resins exemplified by hydroxy-functional polyesters, epoxy resins (through the secondary hydroxyl group in each unit), hydroxy-functional acrylate and methacrylate resins, cellulose esters such as cellulose acetate/butyrate, and polyvinylbutyral.

The weight average molecular weight (Mw) of the resin may range from about 1,000 to about 40,000, preferably between about 1,500 and about 10,000. The hydroxy functionality of the resin is greater than 2 and preferably from 2.2 to about 3.5 or greater and the carboxy functionality may be up to about 5, preferably from about 2.3 to about 3. The polyester resin is predominantly hydroxyl in functionality and its acid number is preferably about 12 or less and, even more preferably, not more than about 5. The hydroxyl number, on the other hand, is preferably from about 25 to about 50, as conventionally reported. The amount of curing agent used depends on the hydroxyl number; as the number goes up, so does the amount of curing agent.

The polyesters are made from aromatic and/or saturated aliphatic acids and polyols by methods which are well known by and routinely practiced by those of ordinary skill in the art. The reactants may be heated to a temperature in the range of from about 135° to 220° C. (about 275° to 430° F.) while being sparged with a stream of inert gas such as nitrogen to remove water as it forms. Vacuum or an azeotrope-forming solvent may be used at the appropriate temperature to assist the removal of water. Examples of aliphatic polycarboxylic acids include succinic acid, glutaric acid, adipic acid, pimelic acid, suberic acid, azelaic acid, sebacic acid, diglycolic acid, 1,12-dodecanoic acid, tetrapropenyl succinic acid, maleic acid, fumaric acid, itaconic acid, malic acid, etc. Examples of aromatic polycarboxylic acids are phthalic acid and its anhydride, isophthalic acid, benzophenone dicarboxylic acid, diphenic acid, 4,4-dicarboxydiphenyl ether, 2,5-pyridine dicarboxylic acid, trimellitic acid, etc. Among the suitable polyols are ethylene glycol, 1,3-propylene glycol, diethylene glycol, neopentyl glycol, and trimethylolpropane. Mixtures the acids and of the polyols may be used. A catalyst such as p-toluene sulfonic acid may be used to speed up the reaction.

The epoxy resins are exemplified by the diglycidyl ether condensation polymers resulting from the reaction of epichlorohydrin with a bisphenol in the presence of an alkaline catalyst. Bisphenol A is most commonly used but the bisphenols B, F, G and H are also suitable. By controlling the operating conditions and varying the ratio of the reactants, products of various equivalent weights can be made. For the purposes of this invention, the epoxide equivalent weight (EEW) may be from about 600 to about 2000 and the hydroxyl equivalent weight may be from about 300 to about 400. These are available from a wide variety of commercial sources. The GT-series of bisphenol A epoxies from Ciba-Geigy, including 7004, 7013, 7014, 7074, and 7097 are examples of useful epoxy resins in this invention. Shell Chemical Co. also supplies suitable epoxy resins under its Epon trademark.

Epoxy/polyester hybrids are also contemplated for use in this invention. The hydroxyl function is contributed by the epoxy resin. Acid functional polyester resins specifically designed for curing with bisphenol A epoxy resins have an acid number of from about 35 to about 75 (equivalent weight about 750–1600) and are generally used at a stoichiometric ratio $\pm 10\%$ with the epoxy. The weight ratio of epoxy to polyester is typically from about 50:50 to about 30:70.

Hydroxy-functional acrylate and methacrylate polymers are exemplified by the homopolymers and copolymers of hydroxyethyl and hydroxypropyl acrylate and methacrylate. Comonomers include alkyl esters of acrylic and methacrylic acid wherein the alkyl group contains from 1 to 8 carbon atoms, styrene, ethylene, propylene, and vinyl monomers. The hydroxyl equivalent weight is from about 600 to about 1400. They are available from the Polymer Division of S. C. Johnson & Son, Inc.

Mixtures of the hydroxy-functional resins are also useful in the practice of this invention.

The resins are curable through the hydroxyl groups with aminoplasts, which are oligomers that are the reaction products of aldehydes such as formaldehyde and glyoxal with amino- or amido-group-carrying substances exemplified by melamine, urea, dicyanodiamide, and benzoguanamine. The curing agent in the coating composition of this invention is preferably one that splits out a volatile by-product, e.g., by a condensation type curing reaction. Especially advantageous are aminoplasts modified with alkanols having from one to four carbon atoms. Urea/glyoxal condensation products and the alkoxylated derivatives thereof are examples of such a curing agent. A curing agent in solid form, such as tetra (methoxymethyl) glycoluril is preferred for convenience in formulation. The tetra (methoxymethyl) glycoluril is available from the Cytec Industries unit of American Cyanamid under its trademark and number POWDERLINK 1174. Other aminoplast crosslinking agents are sold by Cytec under the trademark Cymel. It is possible to use mixtures of the aminoplast resins. Hydroxyl-reactive cross-linking is generally provided in an amount sufficient to react with at least one-half the hydroxyl groups of the polyester, i.e., be present at at least one-half the stoichiometric equivalent of the hydroxyl functionality. Preferably, the cross-linking agent is sufficient to substantially completely react with all of the hydroxyl functionality of the polyester, and cross-linking agents having nitrogen cross-linking functionality are provided in amounts of from about 2 to about 12 equivalents of nitrogen cross-linking functionality per equivalent of hydroxyl functionality of the polyester. This typically translates to an aminoplast being provided at between about 4 and about 20 phr. The amount of curing agent may be from about 4% to about 25% by weight of the resin, but preferably it is from about 6 to about 14%.

The amount of cyclohexanesulfamic acid, also known as cyclamic acid, is from about 0.3 to about 1 part per hundred parts by weight of the resin (phr); the term resin herein meaning the combination of the hydroxy-functional resin and the curing agent. Preferably, the catalyst is used in an amount ranging from about 0.2 to about 0.6 phr, depending upon the concentration of alkaline materials in the formulation.

In a preferred embodiment of the invention, from about 10 to about 70 phr of calcium carbonate or another inorganic basic filler is present as a moderator of the curing reaction. The reproducibilty of the wrinkle is enhanced when such a basic filler is used. Examples of other such basic fillers include other alkaline earth carbonates, nepheline syenite (sold under the trademark and number MINEX #7), and wollastonite. Preferably, the amounts of such basic ingredients are from about 10 to about 100 phr.

An essential property that must be considered when formulating a coating powder is the ability of the powder to flow and fuse into a continuous and void free film. As a guide to formulation chemists, two relatively simple test procedures have been established to measure the ability of a coating powder to fuse over a substrate. One of these is gel time which provides a measure of the reactivity of a given system; the other is the hot plate melt flow (HPMF) test which is a combined measure of both the reactivity and melt viscosity of the coating powder. It is generally true that the gel time and the HPMF are a function of the molecular weight and functionality of the resin, the nature of the curing agent, and the activity of the catalyst. The HPMF and melt viscosity are also influenced by fillers which generally increase the viscosity depending on the amount used, the particle size, the surface area and the surface chemistry of the fillers.

In the context of this invention, the word color and all derivatives of it are used to mean a chromatic color as well as white and black. A colored pigment may be organic or inorganic and is exemplified by phthalocyanine blue, phthalocyanine green, quinacridone red, perylene red, isoindolenone yellow, dioxazine violet, scarlet 3B lake, red 188 azo red, azo pigment yellow #83, and the various iron oxide pigments. White and black pigments, e.g., $TiO_2$ and carbon black, may also be present in the wrinkle-producing powder coating compositions of this invention.

The types and amounts of fillers other than the basic fillers discussed above and of the pigments are to be taken into account when determining the level of catalyst for a particular formulation of the coating powder of this invention. For each 100 parts by weight of the resin, from 0 to about 100 parts by weight of non-basic fillers and pigments may be added to the formulation. Silica, mica, talc, calcium sulfate, barium sulfate, and diatomaceous earth are examples of the non-basic fillers.

Other ingredients may be useful for particular compositions. Flow or leveling agents are useful to promote the formation of a continuous coating. These are exemplified by polyacrylic esters, non-ionic fluorinated alkyl ester surfactants, non-ionic alkylarylpolyether alcohols, and silicones. Benzoin is useful as a bubble release agent. These additives may be present at concentrations of from about 0 to about 2.5 phr.

Melt mixing is the preferred method for making the coating powders. The dry ingredients are weighed into a batch mixer and are mixed with a medium intensity horizontal plow mixer or a lesser intensity tumble mixer; in the latter case care must be taken that all ingredients are thoroughly distributed. When liquids are to be mixed into the powder, a high intensity impeller mixer such as a Henschel or Wellex mixer is advantageous. Mixing times range from about 1 to about 3 minutes for the high intensity mixers to about 0–60 minutes for the tumble mixers. The premix is then further mixed and compounded as the resin is melted in either a single screw or a twin screw extruder for about 0.5 to 1 minute. The extrudate is cooled quickly and broken into small chips suitable for grinding.

The coating powder is applied to substrates by conventional means, including the electrostatic fluidized beds, electrostatic spray guns, and triboelectric guns. Hot flocking may also be used. A coating thickness of from about 1.0 mil to about 25 mils is suitable but a thickness of from about 2.5 to about 4.0 mils is preferred.

ASTM Specification D-3451 defines a procedure for measuring gel time in which a small quantity of powder is dropped onto a hot plate at a given temperature, e.g. 205° C. (400° F.) and stroked with a tongue depressor until continuous and readily breakable filaments are formed when the depressor is lifted from the sample. The elapsed time for this to occur is measured in seconds and is the gel time. Although gel time, by itself, is not an indicator of whether a certain resin composition of this invention will provide a wrinkled finish to the coating made therefrom, the minimum gel time for compositions of this invention is preferably about 30 seconds.

To obtain the desired wrinkle finish, the hot plate melt flow value (HPMF) of the powder coating composition should be at least about 20 mm up to about 150 mm when measured at 375° F. (190° C.). This characteristic may be adjusted through resin viscosity, reactivity, and basic or non-basic filler loading. The gel time must not be greater than about 300 seconds. If these two properties do not fall within these limits, the desired wrinkle finish of this invention is not obtained. In the HPMF test a cylindrical pellet of powder having a diameter of 12.7 mm and 6 mm thick is placed on a hot plate set at 375° F.(190°±2° C.) at an inclination angle of 35°. The pellet melts and runs down the plate. The length of the flow is measured in millimeters. The distance the coating flows is dependent on the initial melt viscosity, the rate of reaction, the temperature at which the test is conducted, and the type and amount of catalyst.

The consistent ability of cyclamic acid to produce a wrinkle finish is illustrated in the examples of hydroxy-functional polyester coating powders that follow.

EXAMPLES 1–19

Coating powders were prepared in accordance with this invention by initially blending tetra (methoxymethyl) glycoluril with the polyester resin and other ingredients identified in Tables I through IV at high speed. The blend was then melt-mixed in a Buss extruder whose front zone was maintained at 180° F. and whose rear zone was unheated. The extrudate was then chipped and ground with 0.2% by weight of colloidal alumina (Degussa) to a fine powder that passed through a 60 mesh screen (U.S. Standard). The HPMF and gel time are given in Tables I through IV.

Precleaned steel test panels (from "Q" Panel co.) measuring 3"×6"×0.032" (7.6×15.2×0.08 cm) were coated using standard electrostatic spray techniques and baked in an oven at about 400° F. (205° C.) for 15 minutes to give a coating having a thickness of about 2-mils. The 60° gloss for each panel was 20 units or less.

TABLE I

| | EXAMPLE NUMBER | | | | | | | | |
|---|---|---|---|---|---|---|---|---|---|
| | 1 | 2 | 3 | 4 | 5 | 6 | 7 | 8 | 9 |
| Hydroxyl Polyester AN745 | 94 | 94 | 94 | 94 | 94 | 94 | 94 | 94 | 94 |
| Tetramethoxymethyl Glycoluril | 6 | 6 | 6 | 6 | 6 | 6 | 6 | 6 | 6 |
| Cyclamic Acid | .35 | .35 | .25 | .45 | .35 | .35 | .35 | .35 | .35 |
| Acrylic Oligomer Flow Control Agent | 1.5 | 1.5 | 1.5 | 1.5 | 1.5 | 1.5 | 1.5 | 1.5 | 1.5 |
| Benzoin | 1.0 | 1.0 | 1.0 | 1.0 | 1.0 | 1.0 | 1.0 | 1.0 | 1.0 |
| Carbon Black | 3.5 | 3.5 | 3.5 | 3.5 | 3.5 | 2.0 | 3.5 | 3.5 | 3.5 |
| Calcium Carbonate | 60 | 60 | 60 | 60 | 40 | 45 | | | |
| Barium Sulfate | | | | | | | 40 | 60 | 60 |
| Titanium Dioxide | | 10 | | | | 20 | | | 15 |
| HPMF @ 375° .75 gm (mm) | 51 | 48 | 67 | 49 | 58 | 61 | 40 | 34 | 38 |
| Gel Time @ 400° F. (sec) | 225 | 211 | 250+ | 138 | 78 | 154 | 36 | 33 | 54 |

AN 745 is sold by Hoechst Celanese
Cyclamic acid is a product of Abbott Laboratories

TABLE II

| | EXAMPLE NUMBER | | |
|---|---|---|---|
| | 10 | 11 | 12 |
| Hydroxyl Polyester AN745 | 94 | 94 | 94 |
| Tetramethoxymethyl Glycoluril | 6 | 6 | 6 |
| Cyclamic Acid | .45 | .50 | .35 |
| Acrylic Oligomer Flow Control Agent | 1.5 | 1.5 | 1.5 |
| Benzoin | 1.0 | 1.0 | 1.0 |
| Calcium Carbonate | 20 | | 15 |
| Titanium Dioxide | 35 | 60 | |
| Fluorescent Whitening Agent | | 0.2 | |
| Dioxazine Violet | 1.5 | | |
| Scarlet 3B Lake | 1.0 | | |
| Red 188 Azo Red | | | 0.5 |
| Azo Pigment Yellow #83 | | | 0.2 |
| HPMF @ 375° F. .75 gm (mm) | 47 | 65 | 104 |
| Gel Time @ 400° (sec) | 101 | 74 | 42 |

TABLE III

| CHEMICAL DESCRIPTION/ FUNCTION | EXAMPLE NUMBER | | |
|---|---|---|---|
| | 13 | 14 | 15 |
| Hydroxyl Polyester AN745 | 94 | 94 | 94 |
| Tetramethoxymethyl Glycoluril | 6 | 6 | 6 |
| Cyclamic Acid | 0.4 | 0.4 | 0.4 |
| Acrylic Oligomer Flow Control Agent | 1.5 | 1.5 | 1.5 |
| Benzoin | 1.0 | 1.0 | 1.0 |
| Nepheline Syenite (Minex #7) | 40 | | |
| Wollastonite | | | 40 |
| Calcium Carbonate | | 40 | |
| Carbon Black | 3.5 | 3.5 | 3.5 |
| HPMF @ 375° F. .75 gm (mm) | 58 | 67 | 70 |
| Gel Time @ 400° F. (sec) | 83 | 136 | 65 |

TABLE IV

| | EXAMPLE NUMBER | | | |
|---|---|---|---|---|
| | 16 | 17 | 18 | 19 |
| Hydroxyl Polyester (AN745) | | 94 | 94 | 94 |
| Hydroxyl Polyester (MORKOTE 90D)* | 91 | | | |
| Tetramethoxymethyl Glycoluril | 9 | 6 | 6 | 6 |
| Cyclamic Acid | .35 | 0.4 | 0.4 | 0.4 |
| Acrylic Oligomer Flow Control Agent | 1.5 | 1.5 | 1.5 | 1.5 |
| Benzoin | 1.0 | 1.0 | 1.0 | 1.0 |
| Calcium Carbonate (Hubercarb Q4) | 40 | | | |
| Calcium Carbonate (Supermite) | | 40 | 20 | |
| Barium Sulfate | | | 20 | |
| Wollastonite | | | | 40 |
| Titanium Dioxide | | 10 | 10 | 10 |
| Carbon Black | 3.5 | 1.0 | 1.0 | 1.0 |
| Iron Oxide Yellow | | 1.0 | 1.0 | 1.0 |
| Iron Oxide Red | | 1.0 | 1.0 | 1.0 |
| HPMF @ 375° F. .75 gm (mm) | 73 | 80 | 80 | 87 |
| Gel Time @ 400° F. (sec) | 52 | 250+ | 143 | 106 |

*Captive product of Morton International, Inc.

EXAMPLE 20–23 and Comparative Examples 1 and 2

The general procedure of Examples 1–19 was followed, using the formulations and obtaining the results shown in Tables V and VI. The criticality of a hydroxy functionality greater than 2 to the formation of a wrinkle finish is shown by these results.

TABLE V

| EX. NO. | 20 | C.E. 1 | C.E. 2 | 21 | 22 | 23 |
|---|---|---|---|---|---|---|
| Resin A | 94.0 | — | — | — | — | — |
| Resin B | — | 94.0 | — | — | — | — |
| Resin C | — | — | 94.0 | — | — | — |
| Resin D | — | — | — | 94.0 | — | — |
| Resin E | — | — | — | — | 94.0 | — |
| Resin F | — | — | — | — | — | 94.0 |
| Aminoplast Cure Agent | 6.0 | 6.0 | 6.0 | 6.0 | 6.0 | 6.0 |
| Cyclamic Acid | 0.35 | 0.35 | 0.35 | 0.35 | 0.35 | 0.35 |
| Acrylic Flow Control | 1.5 | 1.5 | 1.5 | 1.5 | 1.5 | 1.5 |
| Benzoin | 1.0 | 1.0 | 1.0 | 1.0 | 1.0 | 1.0 |
| Titanium Dioxide | 1.0 | 1.0 | 1.0 | 1.0 | 1.0 | 1.0 |
| Iron Oxide Red | 1.0 | 1.0 | 1.0 | 1.0 | 1.0 | 1.0 |
| Carbon Black | 2.5 | 2.5 | 2.5 | 2.5 | 2.5 | 2.5 |
| Calcium Carbonate | 45 | 45 | 45 | 45 | 45 | 45 |
| Gel Time @ 400 F. | 128 | 135 | 144 | 89 | 50 | 76 |
| HPMF @ 375 F. | 81 | 82 | 82 | 59 | 49 | 86 |
| Appearance | W | S | S | W | W | W |

W = wrinkle, S = smooth

TABLE VI

| RESIN | VISCOSITY cps @ 200 C. | FUNCTIONALITY | HYDROXY NUMBER | RESULTS |
|---|---|---|---|---|
| A | 3300 | >2.2 | 30 | WRINKLE |
| B | 2900 | 2.0 | 30 | Non uniform, low gloss |
| C | 4500 | 2.0 | 30 | Non uniform, low gloss |
| D | 5000 | >2.6 | 27.5 | WRINKLE |
| E | >5000 | >2.2 | 35 | WRINKLE |
| F | 4300 | 3.5 | 48 | WRINKLE |

A = Ruco 112 available from Ruco Polymer Corp.
B = Morkote 95 a captive resin of Morton Int.
C = Crylcoat 3109 available from UCB Chemicals
D = AN-745 available from Hoechst Celanese
E = Cargill 3028 available from Cargill
F = Ruco 418A available from Ruco Polymer Corp.

The subject matter claimed is:

1. A method for imparting a wrinkle finish to a powder coating on a substrate comprising applying a powder comprising a hydroxyl-functional resin having a functionality greater than 2, an aminoplast resin as a curing agent, and cyclamic acid as a catalyst to the surface of the substrate and curing the powder.

2. The method of claim 1 wherein the composition contains a basic inorganic filler.

3. The method of claim 2 wherein the filler is calcium carbonate.

4. The method of claim 3 wherein the resin is a polyester having a viscosity at 200° C. of from about 17 to about 90 poises.

5. The method of claim 4 wherein the amount of calcium carbonate is from about 15 to about 40% by weight of the combined weight of the polyester and calcium carbonate.

6. The method of claim 1 wherein the resin has a functionality of from 2.2 to about 3.5.

* * * * *